US011467125B2

(12) United States Patent
Matsushita et al.

(10) Patent No.: US 11,467,125 B2
(45) Date of Patent: Oct. 11, 2022

(54) SENSOR CONTROL DEVICE

(71) Applicant: Hitachi Automotive Systems, Ltd., Hitachinaka (JP)

(72) Inventors: Takayasu Matsushita, Hitachinaka (JP); Kohei Suzuki, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 82 days.

(21) Appl. No.: 17/057,285

(22) PCT Filed: Jul. 3, 2019

(86) PCT No.: PCT/JP2019/026410
§ 371 (c)(1),
(2) Date: Nov. 20, 2020

(87) PCT Pub. No.: WO2020/013044
PCT Pub. Date: Jan. 16, 2020

(65) Prior Publication Data
US 2021/0372964 A1    Dec. 2, 2021

(30) Foreign Application Priority Data
Jul. 13, 2018 (JP) .............................. JP2018-133616

(51) Int. Cl.
*G01N 27/419* (2006.01)
*G01N 27/406* (2006.01)
*G01N 27/416* (2006.01)

(52) U.S. Cl.
CPC ....... *G01N 27/419* (2013.01); *G01N 27/4065* (2013.01); *G01N 27/4163* (2013.01)

(58) Field of Classification Search
CPC ............. G01N 27/419; G01N 27/4065; G01N 27/4163; G01N 27/4175; F02D 41/1494;
(Continued)

(56) References Cited

U.S. PATENT DOCUMENTS 5,052,361 A * 10/1991 Ono ..................... F02D 41/1495
73/23.32
2005/0288847 A1* 12/2005 Inoue ................. G01N 27/4175
123/688

(Continued)

FOREIGN PATENT DOCUMENTS

JP     2006047278 A  *  2/2006  ......... G01N 27/4175
JP     2006-208363 A     8/2006
(Continued)

OTHER PUBLICATIONS

International Search Report with English translation and Written Opinion issued in corresponding application No. PCT/JP2019/026410 dated Oct. 8, 2019.

*Primary Examiner* — Joshua L Allen
*Assistant Examiner* — Shizhi Qian
(74) *Attorney, Agent, or Firm* — Foley & Lardner LLP

(57) ABSTRACT

To provide a sensor control device capable of identifying a short circuit terminal with a simple configuration and whose identification operation is not easily affected by environmental conditions around the sensor. The sensor control device includes a short circuit detection unit that detects a short circuit of a sensor having a plurality of terminals, a resistance value control unit that increases a resistance value of an element between the terminals when the short circuit of the sensor is detected by the short circuit detection unit, and a short circuit terminal identification unit that identifies at which of the plurality of terminals a short circuit occurs when the resistance value control unit increases the resistance value of the element between the terminals to a set value or greater.

10 Claims, 9 Drawing Sheets

(58) Field of Classification Search
CPC ....... F02D 2041/2093; F02D 2041/281; F02D 41/1456; F02D 41/1495
See application file for complete search history.

(56) References Cited

U.S. PATENT DOCUMENTS

| | | | | |
|---|---|---|---|---|
| 2006/0157348 A1* | 7/2006 | Inoue | ................. | F02D 41/1494 73/1.06 |
| 2006/0219553 A1* | 10/2006 | Ieda | .................... | G01N 33/007 204/424 |
| 2008/0077303 A1* | 3/2008 | Zushi | ................. | G01R 31/2829 701/101 |
| 2008/0196490 A1* | 8/2008 | Fukagai | ............. | F02D 41/1495 73/114.72 |
| 2016/0097737 A1* | 4/2016 | Higuchi | ............ | G01N 27/4175 204/401 |
| 2017/0342933 A1 | 11/2017 | Kamiya | | |

FOREIGN PATENT DOCUMENTS

| | | |
|---|---|---|
| JP | 2016-070881 A | 5/2016 |
| JP | 2017-215158 A | 12/2017 |

* cited by examiner

SENSOR CONTROL DEVICE

TECHNICAL FIELD

The present invention relates to a sensor control device that controls a sensor.

BACKGROUND ART

As a means for reducing harmful exhaust gas from automobiles and improving fuel efficiency and drivability, a control device for controlling a state of exhaust gas of an internal combustion engine has been put into practical use. In such a control device, various gas sensors have been used to improve control accuracy. In particular, the use of an air-fuel ratio sensor (LAF sensor) that linearly detects an oxygen concentration in the exhaust gas with respect to a sensor current is in progress.

In the air-fuel ratio sensor, a cell in the sensor is energized via a connected sensor driving circuit, and a concentration of specific gas is measured based on an output from the cell. The air-fuel ratio sensor is equipped with a heater because it is necessary to heat the cell at a predetermined temperature or higher for accurate measurement. The heater can keep the cell at the predetermined temperature or higher and can set the cell to an active state at an early stage.

The sensor driving circuit of the air-fuel ratio sensor is connected to the air-fuel ratio sensor at a plurality of terminals, but it is necessary to protect the sensor and the driving circuit when an abnormal state is detected for the connection. One of the abnormal states is a so-called short circuit state. The short circuit state refers to a state in which a power supply device (for example, a battery) for driving the sensor and the sensor are directly connected to each other.

In OBDII which defines OBD requirements, it is required to identify which of the plurality of terminals is in an abnormal state. However, when the sensor is warmed to a predetermined temperature or higher and the short circuit state is detected in an active state in which the gas concentration can be measured, since a resistance value between the plurality of terminals becomes smaller than that before the activation, a voltage drop between the terminals becomes smaller. Therefore, even if one terminal is in the short circuit state, since the other terminals have the same voltage value, there is a problem in that it becomes difficult to identify between a short circuit terminal and a non-short circuit terminal.

Therefore, PTL 1 proposes a system including an inspection potential circuit for applying an inspection potential in a driving circuit and a connection circuit for connecting between terminals. By appropriately setting the resistance value of the connection circuit, potentials of various terminals can be detected when the inspection potential is applied from the inspection potential circuit.

However, PTL 1 requires the inspection potential circuit for applying the inspection potential in the driving circuit and a special connection circuit that enables connection between the terminals. Further, since the identification operation depends on an internal resistance value of the connection circuit or the like or the inspection potential applied by the inspection potential circuit, there is a problem in that the identification operation is affected by the environmental conditions around the sensor.

CITATION LIST

Patent Literature

PTL 1: JP 2016-070881 A

SUMMARY OF INVENTION

Technical Problem

An object of the present invention is to provide a sensor control device capable of identifying a short circuit terminal with a simple configuration and whose identification operation is not easily affected by environmental conditions around the sensor.

Solution to Problem

In order to solve the above problems, a sensor control device according to a first aspect of the present invention includes a short circuit detection unit that detects a short circuit of a sensor having a plurality of terminals, a resistance value control unit that increases a resistance value of an element between the terminals when the short circuit of the sensor is detected by the short circuit detection unit, and a short circuit terminal identification unit that identifies at which of the plurality of terminals a short circuit occurs when the resistance value control unit increases the resistance value of the element between the terminals to a set value or greater.

Further, a sensor control device according to a second aspect of the present invention includes a short circuit detection unit that detects a short circuit of a sensor having a plurality of terminals, a temperature control unit that decreases a temperature of the sensor when the short circuit of the sensor is detected by the short circuit detection unit, and a short circuit terminal identification unit that identifies at which of the plurality of terminals a short circuit occurs when the temperature control unit sets the temperature of the sensor to a set value or lower.

Advantageous Effects of Invention

According to the first aspect of the present invention, when the short circuit is detected by the short circuit detection unit, the resistance value of the element between the terminals increases by the resistance value control unit, and when the resistance value increases to a certain degree, the identification is performed by the short circuit terminal identification unit. In addition, according to the second aspect of the present invention, when the short circuit is detected by the short circuit detection unit, the temperature of the sensor decreases by the temperature control unit, and when the temperature decreases to a certain degree, the identification is performed by the short circuit terminal identification unit. The resistance value control unit and the temperature control unit can be realized with the simple configuration, and therefore, the terminal in which the short circuit occurs can be realized with the simple configuration. In addition, the operation can be realized without being affected by the environmental conditions around the sensor.

DESCRIPTION OF EMBODIMENTS

Hereinafter, embodiments will be described with reference to the accompanying drawings. In the accompanying drawings, functionally the same elements may be displayed with the same number. Note that the accompanying drawings illustrate embodiments and implementation examples in accordance with the principles of the present disclosure, but are for the purpose of understanding the present disclosure and are not used for the limited interpretation of the present disclosure. The description of the present specification is merely a typical example, and does not limit the scope of claims or application examples of the present disclosure in any sense.

Although the present embodiment has been described in sufficient detail for those skilled in the art to implement the present disclosure, it is necessary to understand that other implementations and forms are also possible and that it is possible to change the configuration and structure and replace various elements without departing from the scope and spirit of the technical idea of the present disclosure. Therefore, the following description should not be construed as limited thereto.

First Embodiment

Figure 1:
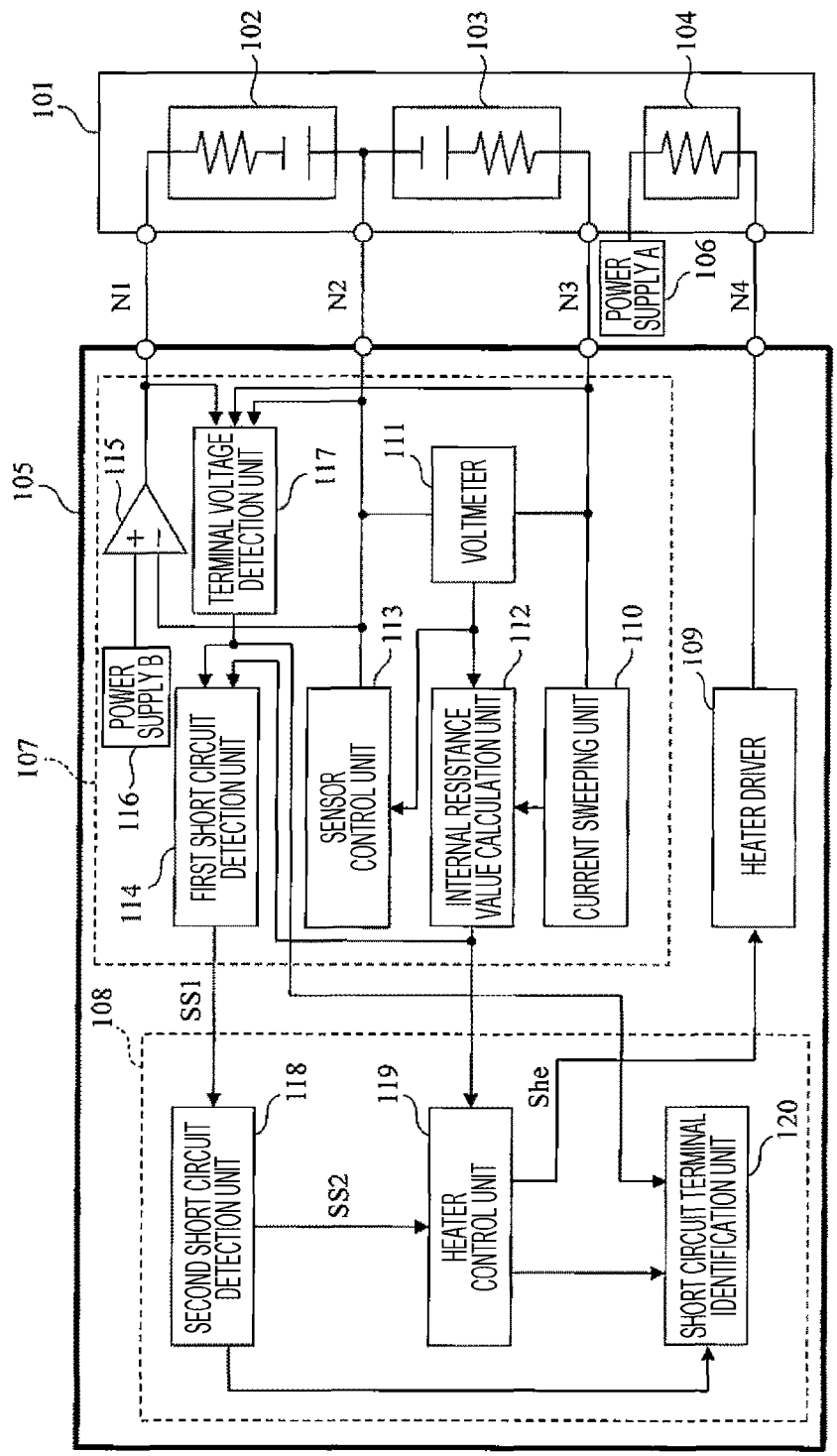
FIG. 1 is an example of an overall configuration diagram of a sensor control device according to a first embodiment.

First, a sensor control device according to a first embodiment will be described with reference to the drawings. FIG. 1 is an example of an overall configuration diagram of a sensor control device 105 according to the first embodiment.

The sensor control device 105 in FIG. 1 is connected to a gas sensor 101 to be controlled via terminals N1 to N4. Here, the gas sensor 101 is, for example, a two-cell type air-fuel ratio sensor (LAF sensor). However, the gas sensor 101 is not limited to the two-cell type air-fuel ratio sensor, and may be a one-cell type air-fuel ratio sensor, an oxygen sensor, a NOx sensor, or the like.

In FIG. 1, the gas sensor 101, which is the two-cell type air-fuel ratio sensor (LAF sensor), includes a pump cell 102, a nernst cell 103, and a heater 104. The pump cell 102 and the nernst cell 103 are connected to the sensor control device 105 through terminals N1, N2, and N3. The pump cell 102 and the nernst cell 103 are connected in series between the terminals N1 and N3, with the terminal N2 as a connection node.

Further, the pump cell 102 and the nernst cell 103 each have a pair of electrodes provided on a solid electrolyte body, and detect a concentration of specific gas. One end of the heater 104 is connected to the sensor control device 105 at the terminal N4, and the other end thereof is connected to the power supply 106. According to the above configuration, in the gas sensor 101, after the nernst cell 103 is heated by the heater 104, a space between the pump cell 102 and the nernst cell 103 is set to be in a state in which oxygen is free and combustibles are free. At this time, in order to set the voltage of the nernst cell 103 as a reference voltage, a current sweeping unit 110 sweeps a current to the nernst cell 103.

In this state, the amount of oxygen detected by the gas sensor 101, that is, $O_2$ ion according to an oxygen concentration in exhaust gas moves between the pump cell 102 and the nernst cell 103 and to the vicinity thereof, so a current flows in the pump cell 102. Therefore, based on the current, it is possible to calculate the oxygen concentration in the exhaust gas, that is, an air-fuel ratio from characteristics of a current and an air-fuel ratio of the gas sensor 101.

The sensor control device 105 is configured to roughly include a driving circuit 107, an arithmetic processing unit 108, and a heater driver 109.

The driving circuit 107 supplies a current and voltage for driving the gas sensor 101 to the gas sensor 101, detects a voltage of each terminal N1 to N3 of the gas sensor 101, and outputs various calculation values or detection signals. The arithmetic processing unit 108 receives various signals output from the driving circuit 107 and outputs various detection signals and control signals. The heater driver 109 drives the heater 104 in the gas sensor 101.

Next, the configuration of the driving circuit 107 will be described in more detail. The driving circuit 107 includes a current sweeping unit 110, a voltmeter 111, an internal resistance value calculation unit 112, a sensor control unit 113, a first short circuit detection unit 114, an operational amplifier 115, a power supply 116, and a terminal voltage detection unit 117.

The current sweeping unit 110 supplies a current for driving the gas sensor 101 to the terminal N3. The voltmeter 111 measures a voltage value between the terminals N1 and N3 when the current is swept from the current sweeping unit 110. The internal resistance value calculation unit 112 calculates an internal resistance value of the nernst cell 103 from the measured value of the voltmeter 111. The sensor control unit 113 controls a current value flowing in the pump cell 102 when the measured value of the voltmeter 111 is a predetermined value or less (when the temperature of the nernst cell 103 is a predetermined value or higher). The arithmetic processing unit 108 calculates an air-fuel ratio from the control value of the sensor control unit 113 based on the characteristics of the current and the air-fuel ratio of the gas sensor 101.

The first short circuit detection unit 114 determines the short circuit state of each terminal N1 to N3 from the calculation value of the voltage of the terminals N1 to N3 detected and calculated by the terminal voltage detection unit 117 and the internal resistance value calculated by the internal resistance value calculation unit 112, and outputs a first short circuit signal SS1. When the potential of the terminals N1 to N3 is higher than the reference value and the internal resistance value of the nernst cell 103 is the predetermined value or greater, the first short circuit detection unit 114 determines that there is a possibility that the short circuit occurs at any of the terminals N1 to N3, and increases the first short circuit signal SS1 from "L" to "H" as a signal indicating the effect.

The operational amplifier 115 applies a power supply voltage of the power supply 116 to a non-inverting input terminal thereof, while the inverting input terminal is connected to the terminal N2 to be applied with an output signal of the sensor control unit 113, and the output terminal is connected to the terminal N1. By connecting the pump cell 102 between the terminals N1 and N2, the operational amplifier 115 and the pump cell 102 form a closed loop control system. As described above, the terminal voltage detection unit 117 measures the voltage of the terminals N1 to N3 and calculates the voltage value. The calculation value is output to the short circuit terminal identification unit 120, which will be described later, in addition to the first short circuit detection unit 114.

Next, the configuration of the arithmetic processing unit 108 will be described in detail. The arithmetic processing unit 108 includes a second short circuit detection unit 118, a heater control unit 119, and a short circuit terminal identification unit 120.

The second short circuit detection unit 118 receives the first short circuit signal SS1 from the first short circuit detection unit 114, determines whether or not it is certain that the short circuit state occurs based on the first short circuit signal SS1, and outputs a second short circuit signal SS2. The heater control unit 119 generates a heater control signal She for driving the heater driver 109 based on the calculation value of the internal resistance value which is the output of the internal resistance value calculation unit 112 and the second short circuit signal SS2. The heater control unit 119 functions as a resistance value control unit that increases the resistance value of the element connected between the terminals or a temperature control unit that decreases the temperature of the sensor according to the detection results of the first short circuit detection unit 114 and the second short circuit detection unit 118.

The heater driver 109 is driven based on the voltage value of the heater control signal She from the heater control unit 119, and the heater 104 is heated accordingly.

As described above, in the present embodiment, the first short circuit detection unit 114 performs a first short circuit detection operation of determining whether or not a short circuit occurs at any of the terminals N1 to N3, and a second short circuit detection unit 118 performs a second short circuit detection operation of determining whether or not it is certain that the short circuit occurs after a predetermined time elapses in response to the result of the first short circuit detection operation. In this way, by performing the two-step determination at different timings, it is possible to reliably perform the determination operation of the short circuit. When the second short circuit detection operation is completed, the second short circuit signal SS2 is output, and the short circuit terminal identification operation is started in the short circuit terminal identification unit 120.

The short circuit terminal identification unit 120 identifies which of the terminals N1 to N3 is in the short circuit state based on the second short circuit signal SS2, the output signal of the heater control unit 119, and the calculation value of the terminal voltage detection unit 117, and outputs the identification result to an external device (not illustrated). Specifically, when it is detected that the internal resistance value of the gas sensor 101 increases to the predetermined value or greater or the temperature decreases to the predetermined value or lower, the short circuit terminal identification unit 120 compares the potentials of the terminals N1 to N3 with each other or compares the potentials of the terminals N1 to N3, respectively, with the predetermined reference value, determines the change in the terminal voltage based on the comparison result, and identifies the terminal in which the short circuit occurs according to the determination result. Then, the short circuit terminal identification unit 120 also functions as a short circuit generation information output unit that outputs the short circuit generation information indicating at which of the plurality of terminals N1 to N3 the short circuit occurs to the external device.

Next, the operation of the sensor control device 105 according to the first embodiment will be described with reference to FIGS. 2A to 7. FIGS. 2A to 6 are flowcharts and timing charts for describing the operation of the sensor control device 105. In addition, FIG. 7 is a graph illustrating a relationship between the temperature and the internal resistance value of the gas sensor 101.

The outline of the procedure of the identification operation of the short circuit terminal in the sensor control device 105 of the first embodiment will be described with reference to the flowchart of FIG. 2A. In a normal routine, the sensor control device 105 supplies the voltage required for operation to the gas sensor 101, and executes an operation of measuring a state of gas (for example, air-fuel ratio) near the gas sensor 101 according to the output signal of the gas sensor 101 in the state. The operation of FIG. 2A is appropriately executed as interrupt processing during the execution of this normal routine.

Figure 2A:
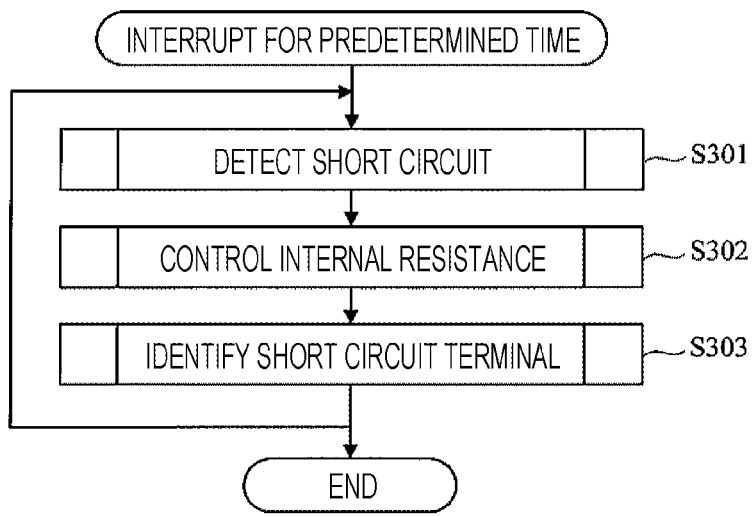
FIG. 2A is a flowchart illustrating an outline of a procedure of an identification operation of a short circuit terminal in a sensor control device according to the first embodiment.

The timing and interval of the execution of the procedure of FIG. 2A does not matter.

When identifying the short circuit terminal in the first embodiment, first, the first short circuit detection unit 114 and the second short circuit detection unit 118 detect that the short circuit occurs at any of the terminals N1 to N3 (short circuit detection operation: step S301). That is, in the first short circuit detection unit 114 and the second short circuit detection unit 118, it is detected that the short circuit occurs at any of the terminals N1 to N3, but specifically, it is not detected at which of the plurality of terminals N1 to N3 the short circuit occurs.

When the short circuit is detected by the first short circuit detection unit 114 and the second short circuit detection unit 118, the heater control unit 119 stops heating the heater 104 in the gas sensor 101 or limits the heating amount of the heater 104, so the internal resistance value of the gas sensor 101 is controlled (internal resistance value increases) (internal resistance control: step S302). When the internal resistance value increases, since the short circuit terminal can be identified from the reason described later, the terminal in the short circuit state is identified by the short circuit terminal identification unit 120 (short circuit terminal identification operation: step S303).

Figure 2B:
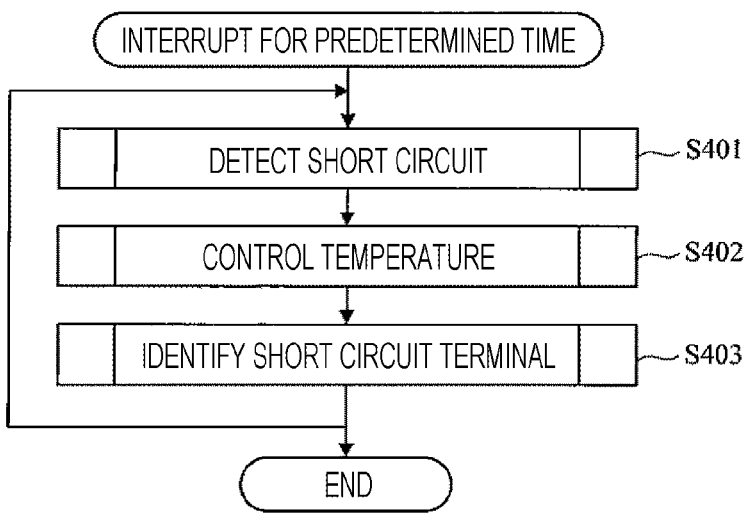
FIG. 2B is a flowchart illustrating another example of a procedure of an identification operation of the short circuit terminal in the sensor control device according to the first embodiment.

As illustrated in FIG. 2B, after the short circuit detection (step S401), it is possible to control the temperature near the gas sensor 101 instead of controlling the internal resistance of the gas sensor 101 (step S402). After the control of the temperature, the short circuit terminal is identified in the same way (step S403). The temperature can be controlled by using a cooling element such as a Peltier element (not illustrated). By the control of the temperature, the temperature of the gas sensor 101 decreases, and as a result, it is possible to control the internal resistance value of the gas sensor 101, thereby obtaining the same effect. In the following, the operation of FIG. 2A will be mainly described.

Figure 3:
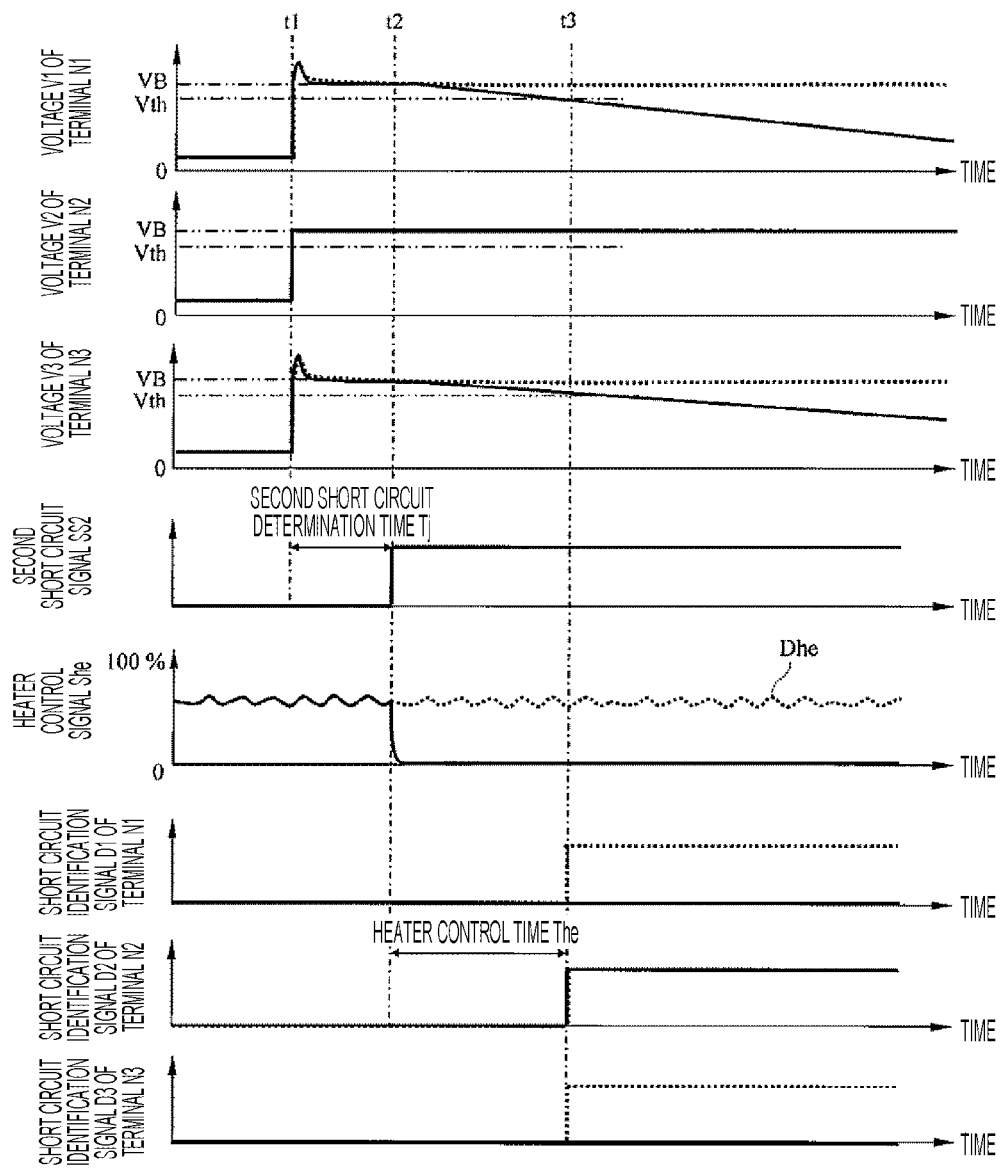
FIG. 3 is a timing chart for describing an operation of the sensor control device according to the first embodiment.
Figure 4:
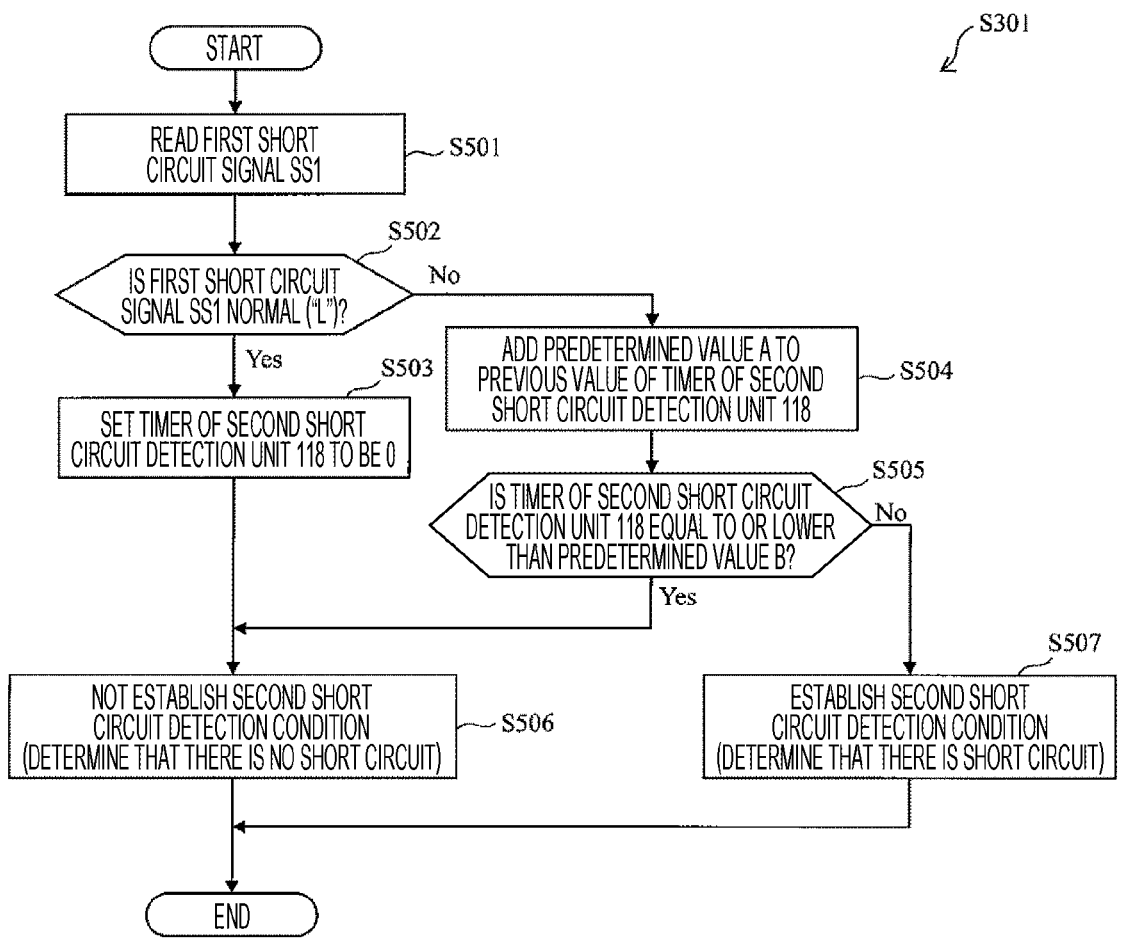
FIG. 4 is a flowchart for describing an operation of the sensor control device according to the first embodiment.

Next, the operation of FIG. 2A will be described in more detail with reference to the timing chart of FIG. 3 and the flowcharts of FIGS. 4 to 6. FIG. 3 illustrates an example of the timing chart of the detection operation of the second short circuit detection unit 118, the control operation of the heater control unit 119, and the identification operation of the short circuit terminal identification unit 120 when the short circuit detection (S301) to the short circuit terminal identification (S303) in FIG. 2A are executed. Here, as an example, the operation of the case where the terminal N2 is short-circuited will be described. In the various graphs of FIG. 3, a horizontal axis indicates time, and a vertical axis indicates the voltages V1 to V3 of the terminals N1 to N3, the second short circuit signal SS2, the heater control signal She, and voltage values of short circuit identification signals D1 to D3 of the terminals N1 to N3. Further, FIGS. 4 to 6 each illustrates detailed execution procedures of steps S301, S302, and S303 of the flowchart of FIG. 2A.

Hereinafter, the specific operation of the short circuit terminal identification procedure in the first embodiment will be described with reference to FIGS. 4 to 6 while referring to the timing chart of FIG. 3. In FIG. 3, times t1 to t2 correspond to step S301 (short circuit detection operation) in FIG. 2A. In addition, times t2 to t3 correspond to step S302 (internal resistance control) in FIG. 2A. Time after the time t3 corresponds to step S303 (short circuit terminal identification operation) in FIG. 2A.

<Time t1 to t2 (Short Circuit Detection Operation)>

For example, at time t1, when the terminal N2 is short-circuited to the power supply 116 (power supply voltage Vcc) and a short circuit occurs, a voltage V2 of the terminal N2 increases to a voltage value VB corresponding to the power supply voltage Vcc as illustrated in a second graph from the top of FIG. 3. When the gas sensor 101 is in operation, the gas sensor 101 is heated by the heater 104 and the internal resistance value thereof decreases. Therefore, as illustrated in the top of FIG. 3 and the third graph from the top, the voltages V1 and V3 of the terminals N1 and N3 that are not short-circuited increase to the voltage value VB substantially at the same time without being affected by the voltage drop due to the internal resistance.

The voltages V1 to V3 of the terminals N1 to N3 are detected and calculated by the terminal voltage detection unit 117, and the first short circuit detection unit 114 compares these calculation values with the reference values. If each voltage (calculation value) exceeds the reference value, the first short circuit detection unit 114 determines that the short circuit occurs at any of the terminals N1 to N3, and outputs the first short circuit signal SS1="H" indicating the effect.

The second short circuit detection unit 118 receives the first short circuit signal SS1, and at time t2 within a predetermined time (second short circuit determination time Tj) from the reception time, determines that it is certain that the short circuit state occurs based on the voltage values of the terminals N1 to N3, and raises the second short circuit detection signal SS2 to "H". This specific procedure will be described with reference to the flowchart of FIG. 4. Steps S501 to 507 in FIG. 4 are performed as part of step S301 in FIG. 2A.

In step S501, the second short circuit detection unit 118 reads the first short circuit signal SS1 from the first short circuit detection unit 114. In step S502, the second short circuit detection unit 118 determines that the short circuit state has not occurred (normal) if the first short circuit signal SS1 is "L", and the process proceeds to step S503. On the other hand, if the first short circuit signal SS1 is "H", it is determined that the short circuit state has occurred (abnormal), and the process proceeds to step S504.

In step S503, the second short circuit detection unit 118 sets an internal timer (not illustrated) of the second short circuit detection unit 118 to "0". Therefore, after that, the detection operation regarding the presence or absence of the short circuit is not performed, and it is determined that the second short circuit detection condition is not satisfied (step S506), and the operation ends (END).

On the other hand, in step S504, the second short circuit detection unit 118 sets the internal timer of the second short circuit detection unit 118 to a value obtained by adding a predetermined value A to a previous value. The predetermined value A is set to an arbitrary constant value. After that, the state of the first short circuit signal SS1 is monitored while the elapsed time after the time t1 is measured with the timer.

After that, in step S505, it is determined whether or not the timer is a predetermined value B or less. When the timer becomes larger than the predetermined value B and the first short circuit signal SS1 is still determined to be "H", the process proceeds to step S507, and it is determined that the second short circuit detection condition is satisfied (that is, it is determined that it is certain that the short circuit has occurred at any of the terminals), and the second short circuit signal SS2 is set to "H", and step S301 ends (END).

On the other hand, when the first short circuit signal SS1 changes to while the timer is the predetermined value B or less, the process proceeds to step S506, and it is determined that the second short circuit detection condition is not satisfied, and the second short circuit signal SS2 is set to "L", and the operation ends. Note that the predetermined value B is, for example, a value corresponding to a time when it can be reliably determined that any of the terminals N1 to N3 of the gas sensor 101 is short-circuited, and corresponds to the second short circuit determination time Tj in FIG. 3. The predetermined value B is set based on the predetermined value A.

<Time t2 to t3 (Internal Resistance Value Control)>

Returning to FIG. 3, the operation at times t2 to t3, that is, the operation related to the internal resistance value control (step S302 in FIG. 2) will be described.

When the second short circuit signal SS2 is set to "H" in the second short circuit detection unit 118, the heater control unit 119 decreases the heater control signal She from "H" to "L". This is an operation for decreasing the temperature of the gas sensor 101 by stopping the heating operation by the heater 104, thereby determining which of the terminals is short-circuited. Note that the heater control signal She can be switched to a plurality of stages instead of switching from "H" to "L" in two stages.

When the heater control signal She is continuously maintained at "H" after time t2 as shown by a dotted line Dhe in FIG. 3, the temperature of the gas sensor 101 is continuously maintained at a high temperature state, and the state in which the internal resistance values of the pump cell 102 and the nernst cell 103 decreases is maintained. Therefore, even if a short circuit occurs at any of the terminals N1 to N3, there is almost no difference in the voltage of the terminals N1 to N3, and it is not possible to determine at which of the terminals the short circuit occurs.

Therefore, in the first embodiment, when the second short circuit signal SS2 is set to "H" in the second short circuit detection unit 118, the heater control signal She decreases from "H" to "L". As a result, since the temperature of the gas sensor 101 decreases, and the internal resistance values of the pump cell 102 and the nernst cell 103 gradually increase (see FIG. 7). In this case, the voltage V2 of the terminal N2 at which the short circuit occurs is still maintained near the original voltage VB, but the voltages V1 and V3 of the terminals N1 and N3 that do not generate the short circuit gradually decreases as the internal resistance increases.

Figure 5:
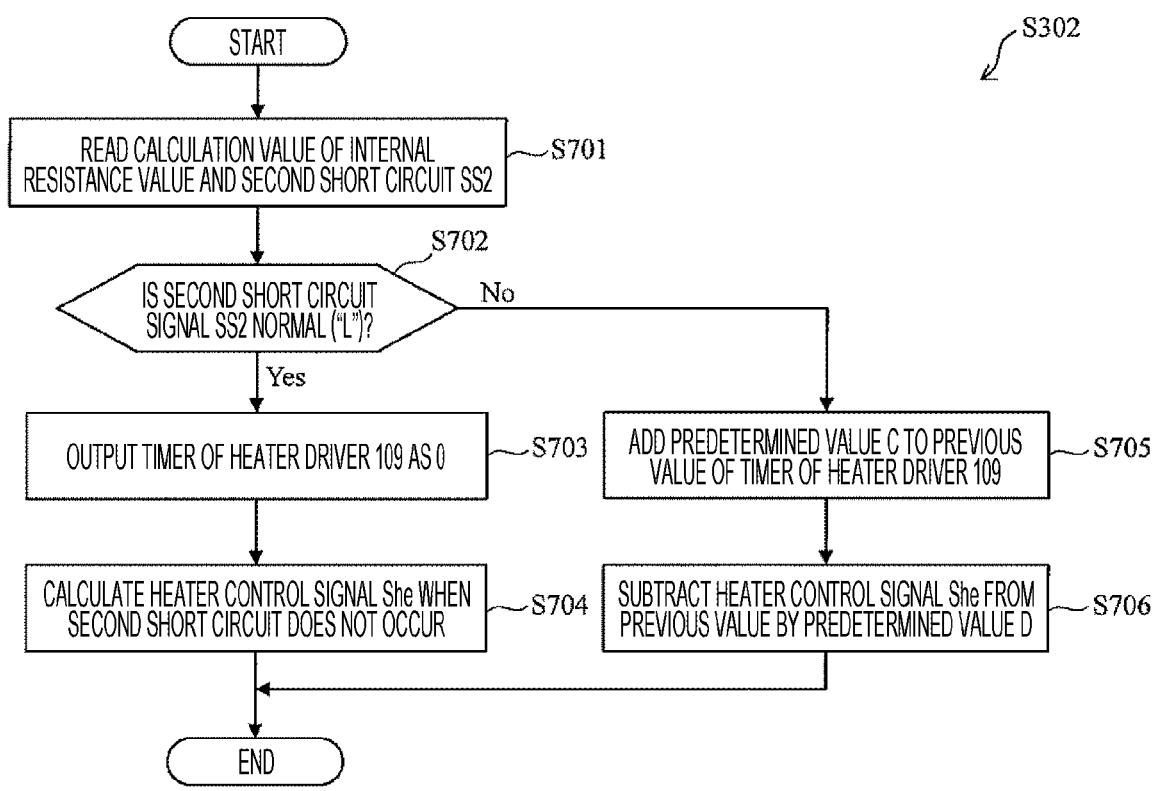
FIG. 5 is a flowchart for describing an operation of the sensor control device according to the first embodiment.

FIG. 5 is a flowchart illustrating details of step S302 in FIG. 2A.

In step S701, the heater control unit 119 receives the calculation value of the internal resistance value of the gas sensor 101 from the internal resistance value calculation unit 112, and reads the second short circuit signal SS2 from the second short circuit detection unit 118. In step S702, if the second short circuit signal SS2 is "L", the heater control unit 119 determines that all the terminals N1 to N3 are in a normal state, and the process proceeds to step S703. On the other hand, if the second short circuit signal SS2 is "H", it is determined that any of the terminals N1 to N3 is in an abnormal state (any of the terminals N1 to N3 is in a short circuit state), and the process proceeds to step S705.

In step S703, the heater control unit 119 sets the timer (not illustrated) in the heater control unit 119 to "0". Therefore, after that, the heater control unit 119 does not perform an operation of decreasing the temperature of the heater 104. That is, in step S704, the heater control unit 119 executes the heater control conforming to the normal state in which the short circuit state does not occur, and calculates and outputs the control signal She for that purpose.

On the other hand, in step S705, it is determined that the occurrence of the short circuit is certain, and as a result, the second short circuit signal SS2 is set to "H", so the heater control unit 119 changes the timer in the heater control unit 119 from the previous value to a value obtained by adding a predetermined value C to the previous value. For the predetermined value C, for example, an arbitrary constant value is set.

Then, in step S706, the heater control unit 119 sets the heater control signal She to a voltage value obtained by subtracting a predetermined value D from the previous value. The predetermined value D is set to a value at which the desired increase in internal resistance value and the desired increase in voltage drop can be obtained. At the same time, in accordance with the setting of the predetermined value D, it is necessary to consider that the gas sensor 101 is not damaged or the like by the sudden decrease of the heater 104.

<After Time t3 (Short Circuit Terminal Identification)>

Returning back to FIG. 3, the operation after the time t3, that is, the operation (step S303 in FIG. 2) of identifying the short circuit terminal will be described.

At time t3 after a predetermined time (heater control time The) has elapsed from time t2, the short circuit terminal identification unit 120 compares the voltages V1 to V3, respectively, of the terminals N1 to N3 with the threshold voltage Vth (reference value), and identifies the terminal N2 at which the short circuit occurs based on the comparison result. In the case of the example of FIG. 3, the voltages V1 and V3 gradually decrease, and fall below a threshold voltage Vth near the time t3. On the other hand, the voltage V2 is maintained near the initial value VB and is larger than the threshold voltage Vth. As a result, it is detected that the terminal at which the short circuit occurs is the terminal N2. Of the short circuit identification signals D1 to D3, only a short circuit identification signal D2 rises to "H", and the others are maintained at "L". In this way, the voltage values of the short circuit identification signals D1 to D3 are switched depending on which terminal is short-circuited, and it becomes possible to specify the terminal short-circuited.

Note that in the above example, the voltages V1 to V3 are compared with the predetermined threshold voltage Vth to identify the terminal short-circuited, but instead, the voltages V1 to V3 can be compared with the power supply voltage Vcc. After the short circuit is detected, the power supply voltage Vcc is compared with the voltages V1 to V3 after a predetermined time has elapsed, and it is determined which of the terminals N1 to N3 is the terminal having the voltage of the value (for example: the closest value) most corresponding to the power supply voltage Vcc.

Figure 6:
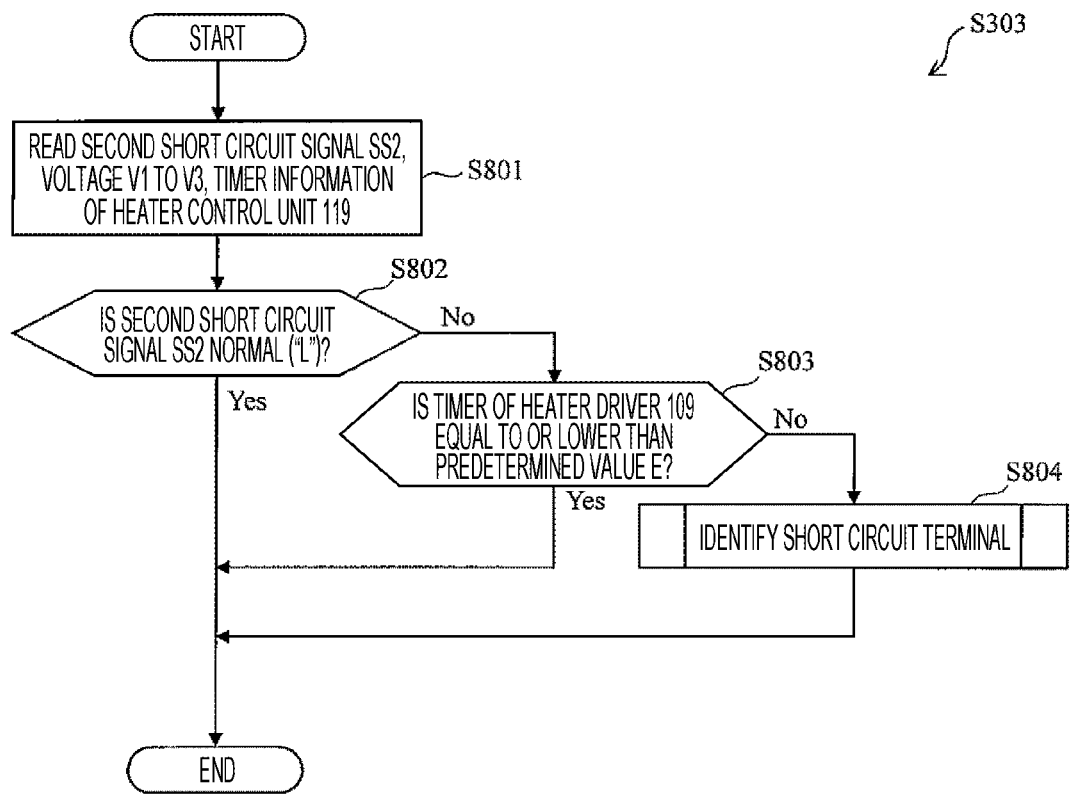
FIG. 6 is a flowchart for describing an operation of the sensor control device according to the first embodiment.
Figure 7:
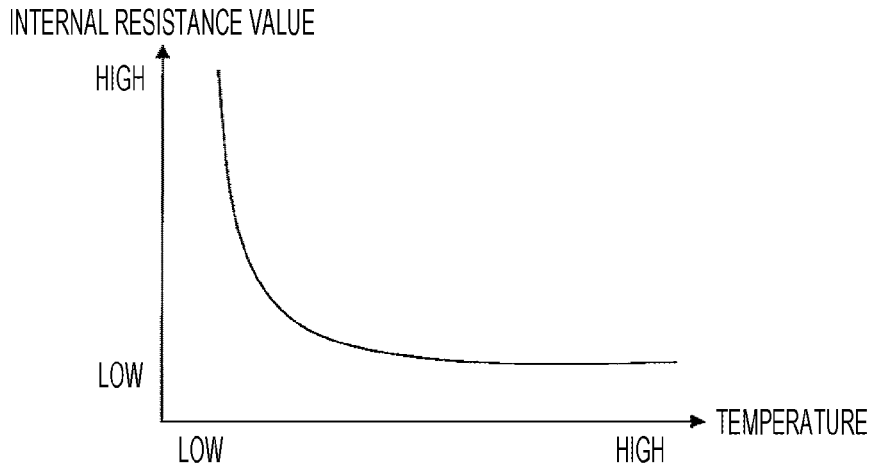
FIG. 7 is a graph illustrating a relationship between a temperature and an internal resistance value of a gas sensor 101.

FIG. 6 is a flowchart illustrating details of step S303 (short circuit terminal identification) in FIG. 2A. In step S801, the short circuit terminal identification unit 120 reads the second short circuit signal SS2, the voltage of terminals N1 to N3, and the timer information of the heater control unit 119 from the second short circuit detection unit 118, the terminal voltage detection unit 117, and the heater control unit 119, respectively.

In the following step S802, the short circuit terminal identification unit 120 determines whether or not the second short circuit signal SS2 is normal depending on whether the second short circuit signal SS2 is "H" or "L". If the second short circuit signal SS2 is "L", this flowchart ends (END), and if the second short circuit signal SS2 is "H", the process proceeds to step S803.

In step S803, the short circuit terminal identification unit 120 determines whether or not a count value of the timer of the heater control unit 119 is a predetermined value E or less. When the counter value is E or less, this flowchart ends, and when the counter value is greater than 5, the process proceeds to step S804. The predetermined value E is a value corresponding to the heater control time The in FIG. 3, and is a value having a magnitude that makes it possible to reliably determine that the voltage drop has occurred between the terminals N1 to N3 due to the decrease in the voltage value of the heater control signal She. The predetermined value E is determined in consideration of the above-described predetermined value C and predetermined value D.

Figure 8:
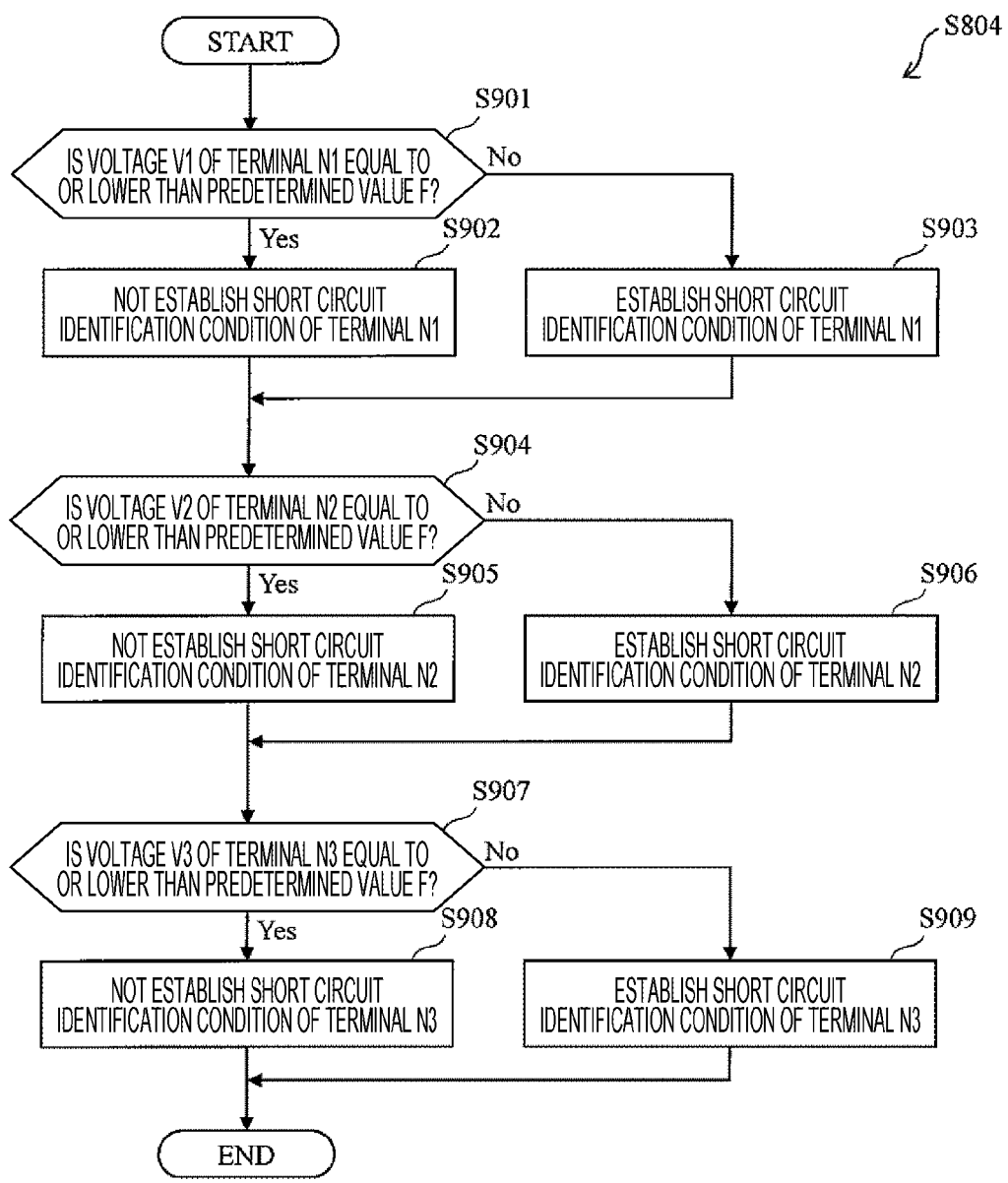
FIG. 8 is a flowchart for describing an operation of the sensor control device according to the first embodiment.

In step S804, in the short circuit terminal identification unit 120, the voltages of the terminals N1 to N3 are compared with a predetermined value F. FIG. 8 is a flowchart illustrating in more detail a procedure of step S804. In steps S901, S904, and S907, the voltages V1 to V3 of the terminals N1 to N3, respectively, are sequentially compared with the predetermined value F, and it is determined that the terminal determined to have a voltage value greater than the predetermined value F is the short circuit state (that the short circuit identification condition is satisfied) (steps S903, S906, and S909), and it is determined that the remaining terminals are not in the short circuit state (that the short circuit identification condition is not satisfied) (steps S902, S905, and S908).

Second Embodiment

Next, the sensor control device according to the second embodiment of the present invention will be described with reference to FIGS. 9 to 10. Since the overall configuration of the device (FIG. 1) is the same as that of the first embodiment, duplicate description will be omitted. Further, the outline (FIG. 2A or 2B and FIGS. 4 to 6) of the operation when the short circuit terminal is identified is also the same as that of the first embodiment. However, in this second embodiment, the method for identifying the short circuit terminal (step S804 in FIG. 6) is different from that in the first embodiment. In this second embodiment, the integrated value of the voltage change amounts of the terminals N1 to N3 is calculated, and the short circuit terminal is identified based on the integrated amount.

Figure 9:
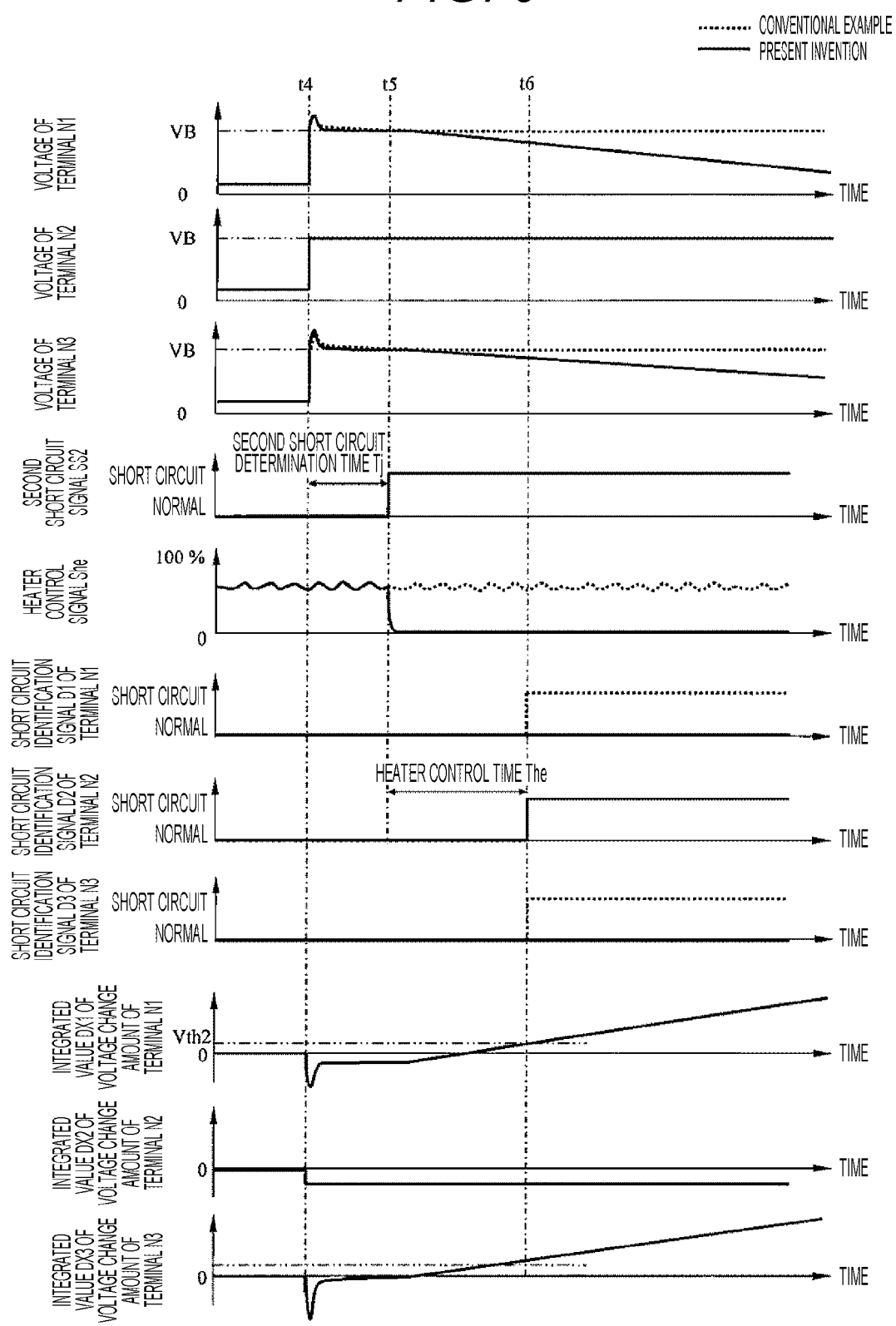
FIG. 9 is a timing chart for describing an operation of a sensor control device according to a second embodiment.
Figure 10:
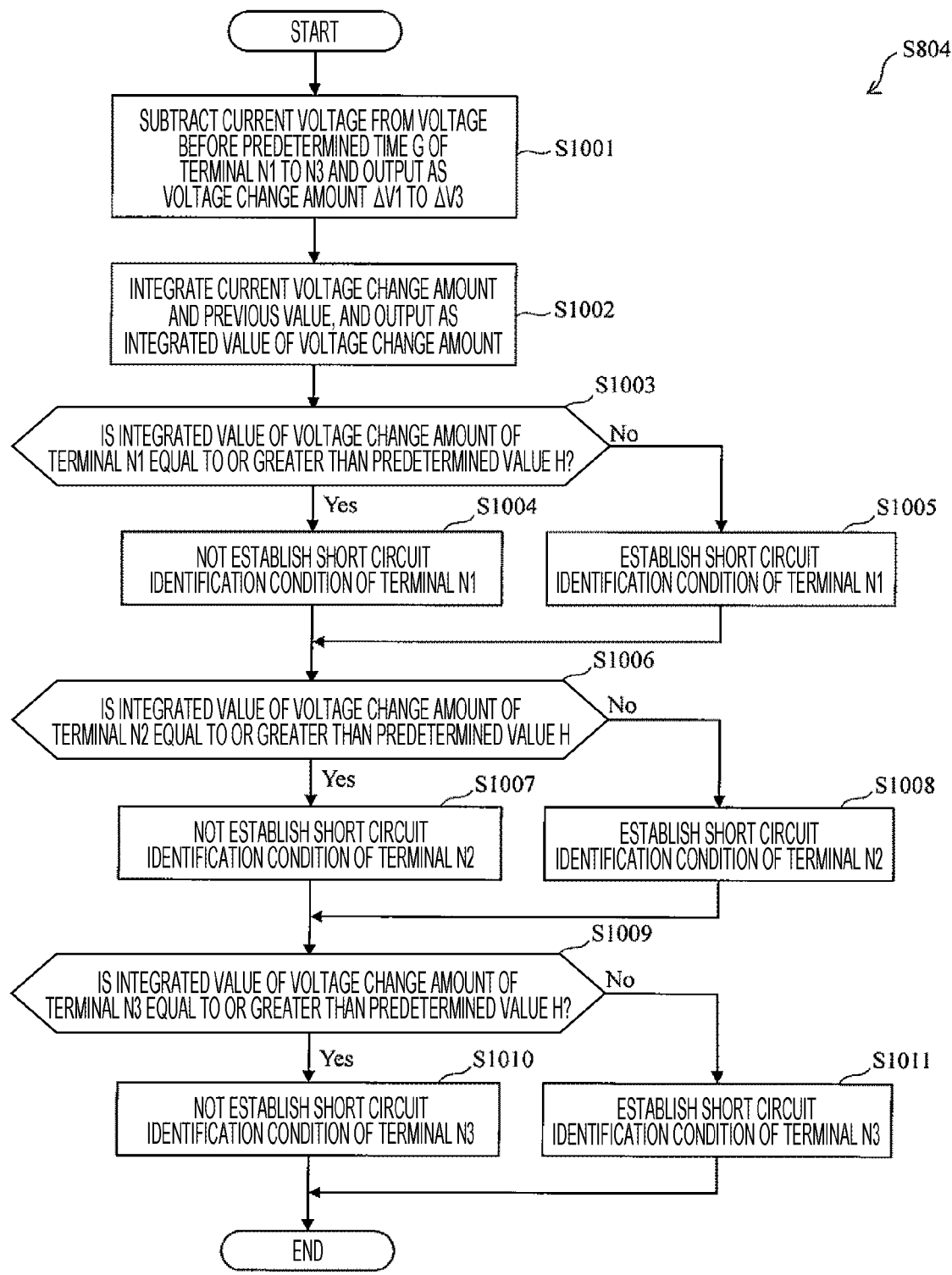
FIG. 10 is a flowchart for describing an operation of the sensor control device according to the second embodiment.

FIG. 9 illustrates an example of the timing chart of the detection operation of the second short circuit detection unit 118, the control operation of the heater control unit 119, and the identification operation of the short circuit terminal identification unit 120 when the short circuit detection (step S301) to the short circuit terminal identification (step S303) in FIG. 2A. Here, as an example, the operation of the case where the terminal N2 is short-circuited will be described. The behaviors of the voltages V1 to V3, the second short circuit signal SS2, the heater control signal She, and the signals D1 to D3 are substantially the same as those in FIG. 3. However, in the operation of FIG. 9, integrated values DX1 to DX3 of the voltage change amounts of the terminals N1 to N3 are calculated, and the terminals at which the short circuit occurs are identified based on the calculation value.

The procedure for executing step S804 (short circuit terminal identification) in FIG. 6 will be described with reference to the flowchart of FIG. 10. This flowchart identifies the terminal at which the short circuit occurs from the integrated value of the change amounts of the voltages V1 to V3 of the terminals N1 to N3 per predetermined time G. The predetermined time G is set, for example, based on a calculation cycle of this flowchart.

In step S1001, the short circuit terminal identification unit 120 subtracts current voltages V1 (0) to V3 (0) from voltages V1 (−G) to V3 (−G) before the predetermined time G of the terminals N1 to N3, and outputs voltage change amounts ΔV1 to ΔV3.

Next, in step S1002, the short circuit terminal identification unit 120 integrates the current voltage change amounts ΔV1 to ΔV3 and the previous values ΔV1 (pr) to ΔV3 (pr), and outputs integrated values ΣΔV1 to ΣΔV3 of the voltage change amounts. In steps S1003, S1006, and S1009, the integrated values ΣΔV1 to ΣΔV3 of the voltage change amounts of the terminals N1 to N3, respectively, are sequentially compared with a predetermined value H, and it is determined that the terminal determined to have the integrated values of the voltage change amounts greater than the predetermined value H is the short circuit state (that the short circuit identification condition is satisfied) (steps S1005, S1008, and S1011), and it is determined that the remaining terminals are not in the short circuit state (that the short circuit identification condition is not satisfied) (steps S1004, S1007, and S1010).

The present invention is not limited to the above-described embodiment, and includes various modifications. For example, the above-described embodiment has been described in detail in order to explain the present invention in an easy-to-understand manner, and is not necessarily limited to those having all the described configurations. Further, it is possible to replace a part of the configuration of one embodiment with the configuration of other embodiments, and it is also possible to add the configuration of another embodiment to the configuration of one embodiment. Further, for some of the configurations of each embodiment, it is possible to add, delete, or replace other configurations.

A part or all of the above detection units, processing units, control units, and the like may be designed with, for example, an integrated circuit and thus may be realized by hardware. Further, each of the above configurations, functions, and the like may be realized by software by allowing the processor to interpret and execute a program that realizes each function. Information such as programs, tables, and files that realize each function can be stored in a memory, a hard disk, a recording device such as an SSD (Solid State Drive), or a recording medium such as an IC card or an SD card. Further, control lines or information lines are shown as necessary for explanation, and all the control lines or information lines are not necessarily shown on products. All configurations may be interconnected. In practice, it may be considered that almost all configurations are interconnected.

REFERENCE SIGNS LIST 101 gas sensor
102 pump cell
103 nernst cell
104 heater
105 sensor control device
107 driving circuit
108 arithmetic processing unit
109 heater driver
111 voltmeter
112 internal resistance value calculation unit
114 first short circuit detection unit
115 operational amplifier
116 power supply
117 terminal voltage detection unit
118 second short circuit detection unit
119 heater control unit
120 short circuit terminal identification unit

The invention claimed is:

1. A sensor control device, comprising:
a short circuit detector circuit configured to detect a short circuit of a sensor having a plurality of terminals;
a resistance value control circuit configured to increase a resistance value of an element between the terminals when the short circuit of the sensor is detected by the short circuit detector circuit; and
a short circuit terminal identification circuit configured to identify at which of the plurality of terminals the short circuit occurs when the resistance value control circuit increases the resistance value of the element between the terminals to a set value or greater,
wherein the resistance value control circuit includes a heater control circuit configured to control heat to the sensor, and
wherein the short circuit detector circuit includes a first short circuit detector circuit and a second short circuit detector circuit, the first short circuit detector circuit configured to detect the short circuit of the sensor and to output, to the second short circuit detector circuit, a first short circuit signal based on a detected short circuit by the first short circuit detector circuit, and the second short circuit detector circuit configured to output a second short circuit signal based on the first short circuit signal to the heater control circuit so as to control heat to the sensor.

2. The sensor control device according to claim 1, further comprising:
a terminal voltage detector circuit configured to detect voltages of the plurality of terminals,
wherein the short circuit terminal identification circuit is configured to identify at which terminal the short circuit occurs based on a change in terminal voltage detected by the terminal voltage detector circuit when the resistance value between the terminals increases to the set value or greater by the resistance value control circuit.

3. The sensor control device according to claim 1, wherein the sensor is a gas sensor that has a solid electrolyte body and at least one cell having a pair of electrodes provided on the solid electrolyte body, and is configured to detect a concentration of specific gas.

4. The sensor control device according to claim 1, further comprising:
a terminal voltage detection circuit configured to detect voltages of the plurality of terminals,
wherein the short circuit terminal identification circuit is configured to identify at which of the plurality of terminals the short circuit occurs based on the voltage of the terminal detected by the terminal voltage detection circuit after a predetermined time elapses after the short circuit of the sensor is detected by the short circuit detector circuit.

5. The sensor control device according to claim 1, further comprising:
a terminal voltage detection circuit configured to detect voltages of the plurality of terminals,
the short circuit terminal identification circuit is configured to identify at which terminal the short circuit occurs based on a comparison result between the voltage detected by the terminal voltage detection circuit and a threshold voltage.

6. The sensor control device according to claim 1, further comprising:
a terminal voltage detection circuit configured to detect voltages of the plurality of terminals,
wherein the short circuit terminal identification circuit is configured to identify at which terminal the short circuit occurs based on a comparison result between an integrated value of a change amount of the voltage detected by the terminal voltage detection circuit and a threshold voltage.

7. The sensor control device according to claim 1, further comprising:
a terminal voltage detection circuit configured to detect voltages of the plurality of terminals,
wherein the short circuit terminal identification circuit is configured to identify at which terminal the short circuit occurs based on a correspondence between the voltage of the terminal detected by the terminal voltage detection circuit and a voltage of a power supply driving the sensor.

8. The sensor control device according to claim 1, further comprising:
a short circuit generation information output circuit configured to output short circuit generation information indicating at which of the plurality of terminals identified by the short circuit terminal identification circuit the short circuit occurs to an external device.

9. A sensor control device, comprising:
a short circuit detector circuit configured to detect a short circuit of a sensor having a plurality of terminals;
a temperature control circuit configured to decrease a temperature of the sensor when the short circuit of the sensor is detected by the short circuit detector circuit; and
a short circuit terminal identification circuit configured to identify at which of the plurality of terminals the short circuit occurs when the temperature control circuit sets the temperature of the sensor to a set value or lower,
wherein the temperature control circuit includes a heater control circuit configured to control heat to the sensor, and
wherein the short circuit detector circuit includes a first short circuit detector circuit and a second short circuit detector circuit, the first short circuit detector circuit configured to detect the short circuit of the sensor and to output, to the second short circuit detector circuit, a first short circuit signal based on a detected short circuit by the first short circuit detector circuit, and the second short circuit detector circuit configured to output a second short circuit signal based on the first short circuit signal to the heater control circuit so as to control heat to the sensor.

10. The sensor control device according to claim 9, further comprising:
a terminal voltage detector circuit configured to detect voltages of the plurality of terminals,
wherein the short circuit terminal identification circuit is configured to identify at which of the terminals the short circuit occurs based on a change in terminal voltage detected by the terminal voltage detector circuit when the temperature of the sensor is the set value or lower by the temperature control circuit.

* * * * *